(12) United States Patent
Sakakibara

(10) Patent No.: US 6,373,228 B1
(45) Date of Patent: Apr. 16, 2002

(54) BATTERY CHARGING DEVICE

(75) Inventor: Kazuyuki Sakakibara, Anjo (JP)

(73) Assignee: Makita Corporation (JP)

( * ) Notice: Subject to any disclaimer, the term of this patent is extended or adjusted under 35 U.S.C. 154(b) by 0 days.

(21) Appl. No.: 09/710,741

(22) Filed: Nov. 9, 2000

(30) Foreign Application Priority Data

Nov. 10, 1999 (JP) .......................................... 11-319678

(51) Int. Cl.⁷ .......................... H02J 7/16; G01N 27/416
(52) U.S. Cl. ........................ 320/150; 324/431; 320/151
(58) Field of Search .......................... 324/431; 320/150, 320/151

(56) References Cited

U.S. PATENT DOCUMENTS

| | | | |
|---|---|---|---|
| 4,308,493 A | 12/1981 | Köthe et al. .................. 320/35 |
| 4,370,606 A | 1/1983 | Kakumoto et al. ........... 320/35 |
| 5,241,259 A | 8/1993 | Patino et al. .................. 320/35 |
| 5,480,734 A | 1/1996 | Schulz et al. .................. 429/7 |
| 5,497,068 A | 3/1996 | Shiojima ...................... 320/35 |
| 5,652,500 A | 7/1997 | Kadouchi et al. ............. 320/15 |
| 5,659,239 A | 8/1997 | Sanchez et al. ............... 320/22 |
| 5,739,673 A | 4/1998 | Le Van Suu .................. 320/31 |
| 5,886,527 A | 3/1999 | Ito .............................. 324/431 |
| 5,909,101 A | 6/1999 | Matsumoto et al. ........ 320/110 |
| 5,912,547 A | 6/1999 | Grabon ....................... 320/150 |
| 5,982,152 A * | 11/1999 | Watanabe et al. ........... 320/150 |
| 6,008,628 A | 12/1999 | Brotto ........................ 320/137 |
| 6,075,347 A | 6/2000 | Sakakibara .................. 320/150 |
| 6,124,698 A | 9/2000 | Sakakibara .................. 320/110 |
| 6,133,713 A | 10/2000 | Brotto ........................ 320/150 |
| 6,188,202 B1 * | 2/2001 | Yagi et al. ................... 320/150 |

FOREIGN PATENT DOCUMENTS

| | | |
|---|---|---|
| EP | 0621990 | 6/1996 |
| JP | 04351488 A | 12/1992 |
| JP | 05244729 A | 8/1993 |
| JP | 06121468 A | 4/1994 |
| JP | 07007865 A | 1/1995 |
| JP | 07123604 A | 5/1995 |
| JP | 07153497 A | 6/1995 |
| JP | 07284235 A | 10/1995 |
| JP | 18298140 A | 11/1996 |
| JP | 08327711 A | 12/1996 |
| JP | 08164597 A | 1/1998 |
| WO | WO 91/08604 | 6/1991 |
| WO | WO 95/09471 | 4/1995 |

* cited by examiner

*Primary Examiner*—Gregory J Toatley, Jr.
(74) *Attorney, Agent, or Firm*—Welsh & Katz, Ltd.; Thomas W. Tolpin

(57) ABSTRACT

Rotation of an air-blowing motor is continued also upon completion of charge; by retrieving a presumed temperature for cooling and upon detecting that a measured temperature is higher than the presumed temperature for cooling by not less than a specified value, a LED lamp is switched ON for indicating that clogging of an airflow path of a battery package has occurred, and an abnormal condition is written to an EEPROM of the battery package.

4 Claims, 8 Drawing Sheets

BATTERY CHARGING DEVICE

BACKGROUND OF THE INVENTION

The present invention relates to a battery charging device for charging batteries, and particularly to a battery charging device that performs charge while forcibly air-cooling batteries such as nickel-metal hydride batteries that generate a large amount of heat at the time of charging.

Nickel-metal hydride batteries are being presently used as batteries employed as power sources for use in power tools or the like. While such nickel-metal hydride batteries enable an increase in capacity than compared to nickel-cadmium batteries, they exhibit drawbacks in that the amount of generated heat at the time of charge is large, and in case a high temperature is reached through the heat generation, electrodes of internal cells of batteries or separators are degraded to thereby shorten the life of the batteries. In view of this fact, it has been proposed for an invention as, for instance, recited in Japanese Utility Model Application Unexamined Publication No. 6-54209 (1994), wherein an air-blower is provided in a battery charger for supplying air to terminal portions while an airflow path passing through batteries are formed in a battery package, and air from the air-blower is communicated through the batteries with the air-blower being attached to the battery charger for restricting rises in temperature of the batteries.

With this arrangement, it is enabled to restrict rises in temperature of nickel-metal hydride batteries. Particularly when air is continuously supplied also upon completion of charge, the nickel-metal hydride batteries, which have reached a high temperature at the time of completion of charge, may be cooled in a short time. However, in case of an abnormal condition of the air-blower, the nickel-metal hydride batteries reach a high temperature since charge is performed in a short time with a large amount of current presupposing that cooling is performed through forced air-cooling, and the batteries will be exposed to the high temperature condition for a long time after completion of charge so that shortening of their lives are unavoidable. Particularly, due to the provision of the airflow path in the battery package, impurities are apt to enter the airflow path when the battery package is being used by being attached to a power tool, and it may happen that appropriate cooling cannot be performed owing to clogging of the airflow path. While such conditions are fatal that cause shortening of life of the batteries, such clogging of the airflow path in the interior of the battery package may be hardly found on visual inspection.

The invention has been made to solve the above-described subjects, and it is an object thereof to provide a battery charging device with which abnormalities of a cooling means can be appropriately indicated.

A still further object of this present invention is to provide a battery charging device in which clogging of the airflow path provided in batteries can be detected.

BRIEF SUMMARY OF THE INVENTION

In order to accomplish the above objects, a battery charging device provided with a cooling means for continuing cooling of batteries also upon completion of charge, according to the present invention, is characterized by comprising:

a judging portion for judging whether a battery temperature at the time of completion of charge is higher than a presumed temperature for cooling the batteries by not less than a specified value, and an abnormality indicating portion for indicating an abnormal condition in case it is judged by the judging portion that the temperature is higher by the specified value.

In the invention, an abnormal condition is indicated in case it is detected that a temperature of batteries at the time of completion of charge is higher than a presumed temperature after cooling of the batteries by not less than a specified value. With this arrangement, in case abnormalities shall occur in the cooling means, such abnormalities can be detected and indicated.

A battery charging device provided with an air-blowing motor for continuing supply of air to batteries provided with an airflow path also upon completion of charge, according to the present invention, is characterized by comprising:

a judging portion for judging whether a battery temperature at the time of completion of charge is higher than a presumed temperature for cooling the batteries by not less than a specified value, and an abnormality indicating portion for indicating an abnormal condition in case it is judged by the judging portion that the temperature is higher by the specified value and in case the air-blowing motor is continuing its operations.

In the invention, an abnormal condition is indicated in case it is detected that a temperature of batteries at the time of completion of charge is higher than a presumed temperature after cooling of the batteries by not less than a specified value and in case an air-blowing motor is continuing its operation. In other words, by detecting a condition in which the battery temperature does not decrease while the air-blowing motor is being operated, clogging of the airflow path of the batteries may be indicated.

In accordance with the more preferred teaching of the present invention, the abnormality indicating portion further indicates an abnormal condition when the air-blowing motor cannot be rotated.

In the invention, an abnormal condition is indicated in case the air-blowing motor cannot be rotated, so that an abnormal condition of the air-blowing motor can be appropriately indicated.

A battery charging device provided with an air-blowing motor for continuing supply of air to batteries incorporating therein a memory means and being provided with an airflow path also upon completion of charge, according to the present invention, is characterized by comprising:

a charge current controlling portion for judging whether an abnormal condition is stored in the memory means incorporated in the batteries, and for performing charge at ordinary current in case no abnormal condition is stored, and for performing charge by decreasing the charge current in case an abnormal condition is stored, a judging portion for judging whether a battery temperature at the time of completion of charge is higher than a presumed temperature for cooling the batteries by not less than a specified value, and a memory portion for storing an abnormal condition to the memory means incorporated in the batteries in case it is judged by the judging portion that the temperature is higher by not less than the specified value.

In the invention, clogging of the airflow path of the batteries is detected by a judging portion in case the battery temperature at the time of completion of charge becomes higher than a presumed temperature after cooling of the batteries by not less than a specified value, and a memory portion stores such abnormality in a memory means incorporated in the batteries. A charge current control portion further judges whether the abnormality that has occurred at the previous charge is stored in the memory means incorporated in the batteries, and in case the abnormality has been stored, the charge current is decreased for performing charge. With this arrangement, batteries that may not be appropriately cooled owing to clogging of the airflow path may also be charged in an optimal manner by decreasing the charge current.

DETAILED DESCRIPTION OF THE INVENTION

The battery charging device according to the preferred embodiments of the present invention will now be explained with reference to the drawings.

Figure 1:
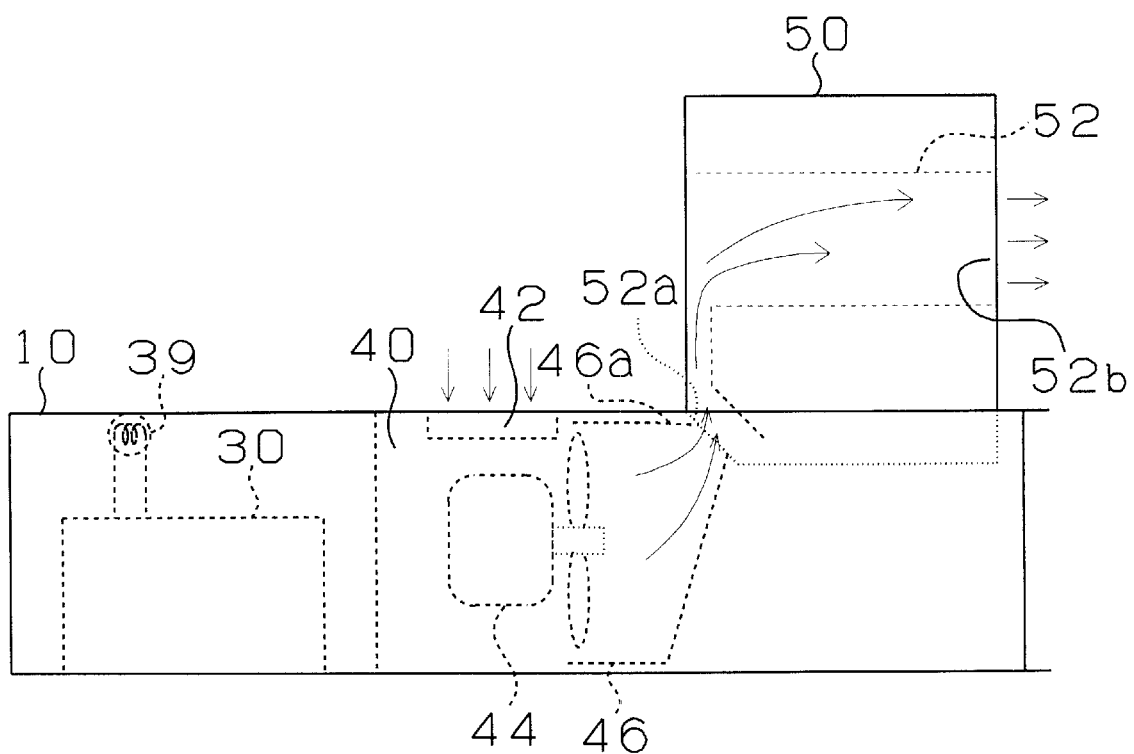
FIG. 1 is an explanatory view of the battery charging device and a battery package according to a first embodiment of the present invention.

FIG. 1 illustrates a battery charging device 10 and a battery package 50 according to a first embodiment of the present invention. In the illustrated embodiment, an airflow path 52 is formed in the battery package 50. The battery charging device 10 is comprised of a control circuit 30 for performing charge of the battery package 50 and a cooling means 40 for forcibly air-cooling the battery package 50. The control circuit 30 is provided with a LED lamp 39 for indicating defects when the cooling means 40 is out of order. The cooling device 40 is comprised of a filter 42 for adhering dust contained in air, an air-blowing motor 44, and a duct 46 for introducing air from the air-blowing motor 44. An aperture 46a of the duct 46 is formed to be in communication with an inlet 52a of the airflow path 52 of the battery package 50 when the battery package 50 is in the attached condition.

Figure 2:
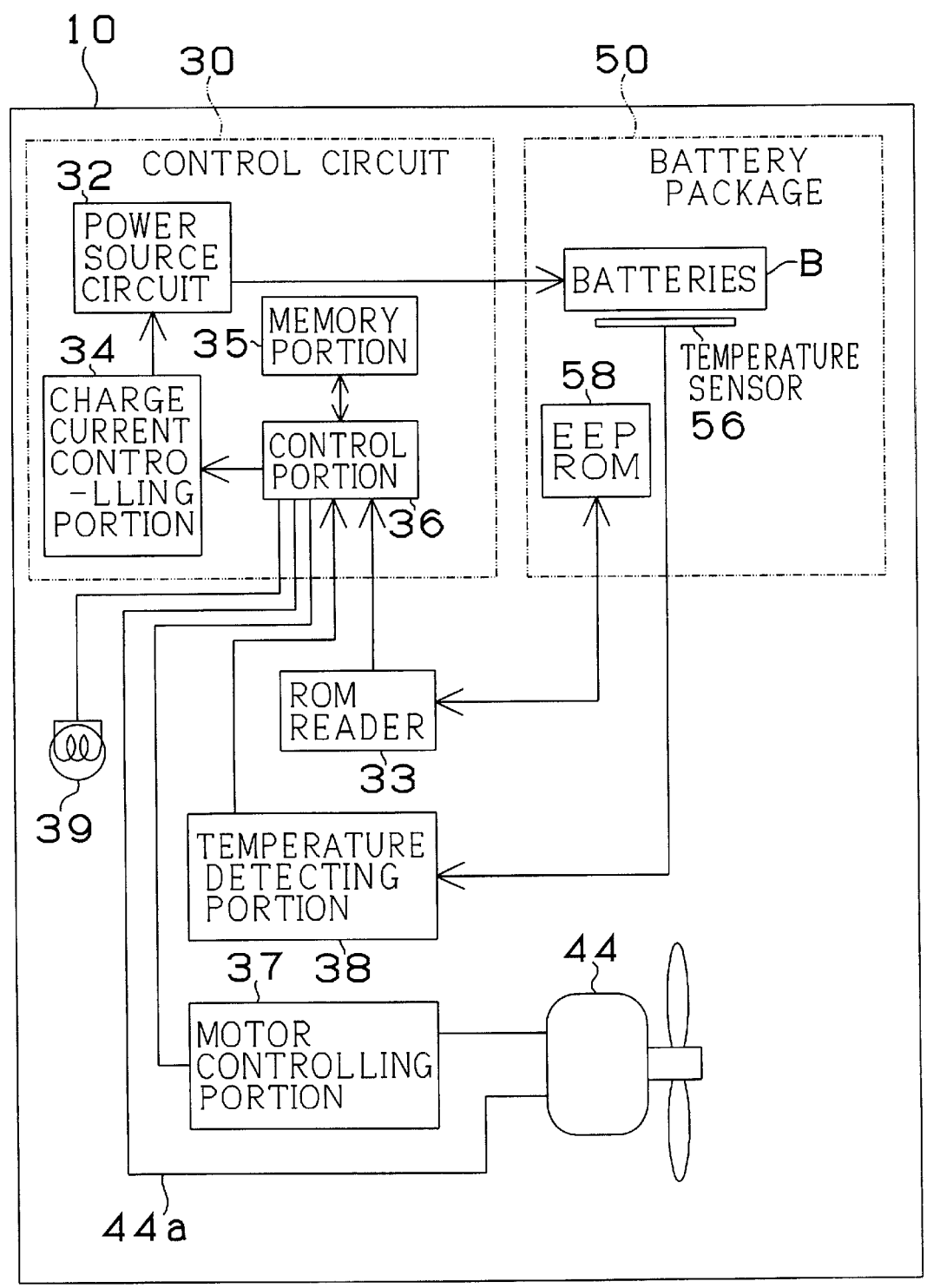
FIG. 2 is a block diagram showing a control circuit of the battery charging device according to the first embodiment.

FIG. 2 illustrates an arrangement of the control circuit 30 provided within the battery charging device 10. The control circuit 30 is comprised of the following: a temperature detecting portion 38 for detecting a temperature of the batteries based on an output value of the temperature sensor (thermistor) 56 provided on the battery package 50 side; a memory portion 35 for storing information for controlling charge current values; a control portion 36 for obtaining a current value with which charge may be performed from the temperature value as output from the temperature detecting portion 38 and outputting the current value as a current command value to a charge current controlling portion 34; a charge current controlling portion 34 for controlling a power source circuit 32 based on the current command value from the control portion 36 and for adjusting a charge current for the batteries; a motor controlling portion 37 for switching supply of power to the air-blowing motor 44 ON/OFF; and a ROM reader 33 for reading contents of an EEPROM 58 of the battery package 50. The air-blowing motor 44 of the illustrated embodiment is arranged in that monitoring signals (fan lock signals) are output through a signal line 44a to the control portion 36 side. More particularly, it is arranged such that a low signal is output to the signal line 44a during rotation when power is supplied from the motor controlling portion 37, and a high signal is output in case rotation cannot be performed (fan locked).

Figure 3:
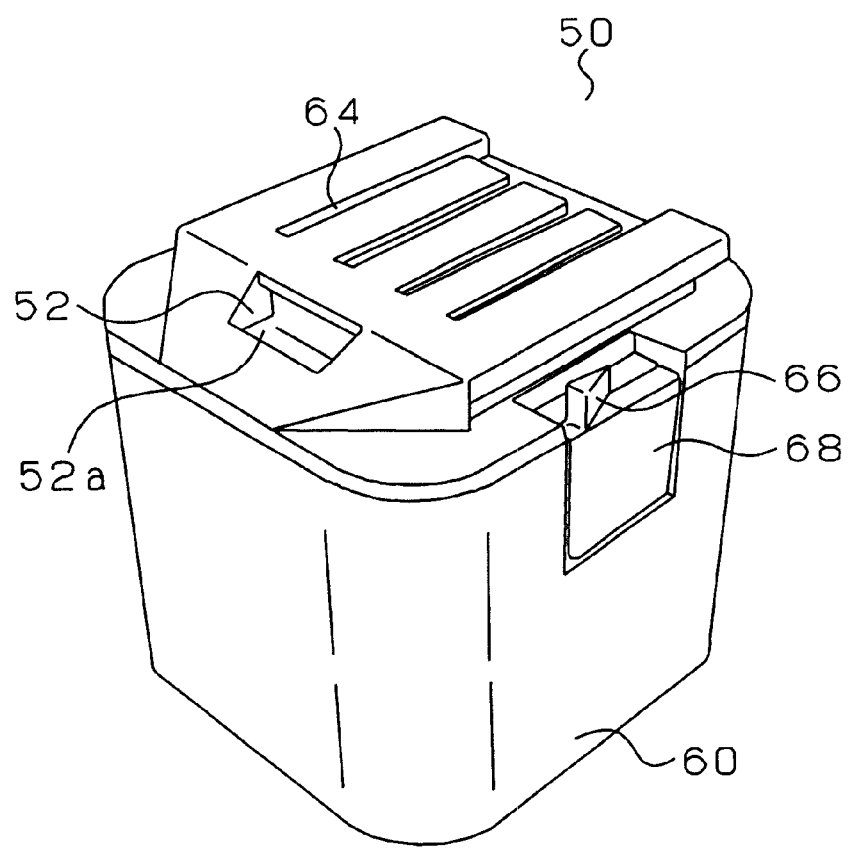
FIG. 3 is a perspective view of the battery package.
Figure 4:
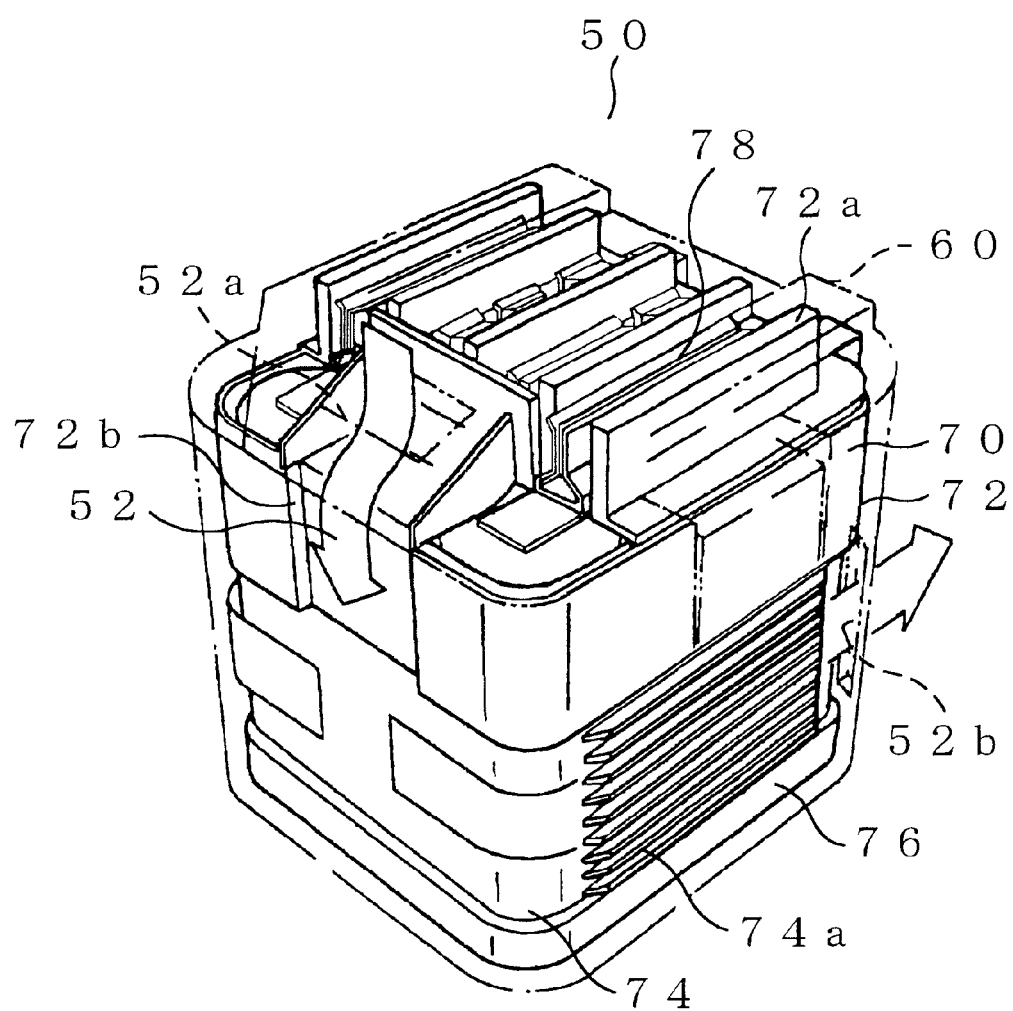
FIG. 4 is a perspective view showing a ventilating condition of the airflow path of the battery package.

The arrangement of the battery package 50 will be further explained in details with reference to FIGS. 3 and 4.

FIG. 3 is a perspective view of the battery package 50 and FIG. 4 a perspective view of the airflow path 52 wherein an outer case 60 of the battery package is illustrated to be transparent. The battery package 50 is arranged as a double structure with an inner case 70 incorporating therein nickel-metal hydride batteries (not shown) is accumulated in the outer case 60, and the airflow path 52 is formed between the outer case 60 and the inner case 70. The inner case 70 is of air-tight structure, and even if water or dust shall enter through the airflow path 52, the batteries are still arranged to be isolated.

The inlet 52a of the airflow path 52 as illustrated in FIG. 3 is arranged as explained above with reference to FIG. 1, to be in communication with the aperture 46a of the duct 46 provided in the cooling means 40 when the battery package is attached to the battery charging device 10. A slit 64 for mounting purposes to a power tool (not shown) is formed on an upper portion of the battery package 50, and a locking button 68 provided with a stopper 66 for fixing the package to the power tool is formed on a lateral portion thereof.

The inner case 70 as illustrated in FIG. 4 is comprised of an upper lid 72, a lower lid 76, and a heat-radiating plate 74 provided between the upper lid 72 and the lower lid 76. Upright walls 72a are formed on an upper portion of the upper lid 72 to be parallel to the slit as illustrated in FIG. 3, and charge terminals 78 are provided between the upright walls 72a for connection to the battery charging device and the power tool. The heat-radiating plate 74 is formed of aluminum, wherein a heat-radiating fin 74a is formed on an outer side thereof while an insulating resin coating is provided on an inner side thereof. The plate is in directed contact with the nickel-metal hydride batteries incorporated therein through the insulating resin coating.

A concave portion 72b comprising a part of the airflow path 52 is formed on a lateral side of the upper lid 72. A stepped portion comprising a part of the airflow path 52 is provided between the upper lid 72 and the heat-radiating plate 74 and between the same and the lower lid 76. Air that has entered through the inlet 52a of the airflow path 52 passes through the heat-radiating fin 74a of the heat-radiating plate 74 that is in direct contact with the nickel-metal hydride batteries as explained above, and is exhausted through an outlet 52b formed in the outer case 60.

Detection of defects of the cooling means 40 in the battery charging device 10 will now be explained. In the battery charging device 10 of the illustrated embodiment, operations of the air-blowing motor 44 are observed through the signal line 44a as described above with reference to FIG. 2 on a basis of monitor signals (fan lock signals), and in case the air-blowing motor 44 is locked, the LED lamp 39 is switched ON for indicating an abnormal condition of the cooling means 40. With this arrangement, it is possible to avoid using the cooling means 40 in a defect condition, and thus to prevent shortening of the life of the battery package.

The battery charging device 10 farther observes clogging of the airflow path 52 of the battery package 50. This observation of clogging will be explained with reference to FIG. 5. In the graph, the longitudinal axis represents battery temperature and the lateral axis represents time. Here, charge is started at timing 0, charge is terminated at timing T1, and the air-blowing motor 44 is kept on rotating also upon completion of charge for cooling the battery package 50. In the graph, the solid line represents a condition in which no clogging of the airflow path 52 is present and the temperature is appropriately decreasing, and the broken line a condition in which clogging has occurred and the temperature cannot be decreased. The battery charging device 10 judges whether the battery temperature at the time of completion of charge is higher than a presumed temperature to which the batteries are to be cooled by not less than a specified value and whether the air-blowing motor 44 continues its operations, and if so, the LED lamp 39 is switched ON for indicating an abnormal condition. In other words, by detecting a condition in which the battery temperature does not decrease while the air-blowing motor 44 is continuing its operation, it is possible to indicate clogging of the airflow path 52 of the battery package 50 or clogging of the filter 42 as illustrated in FIG. 1.

Figure 6:
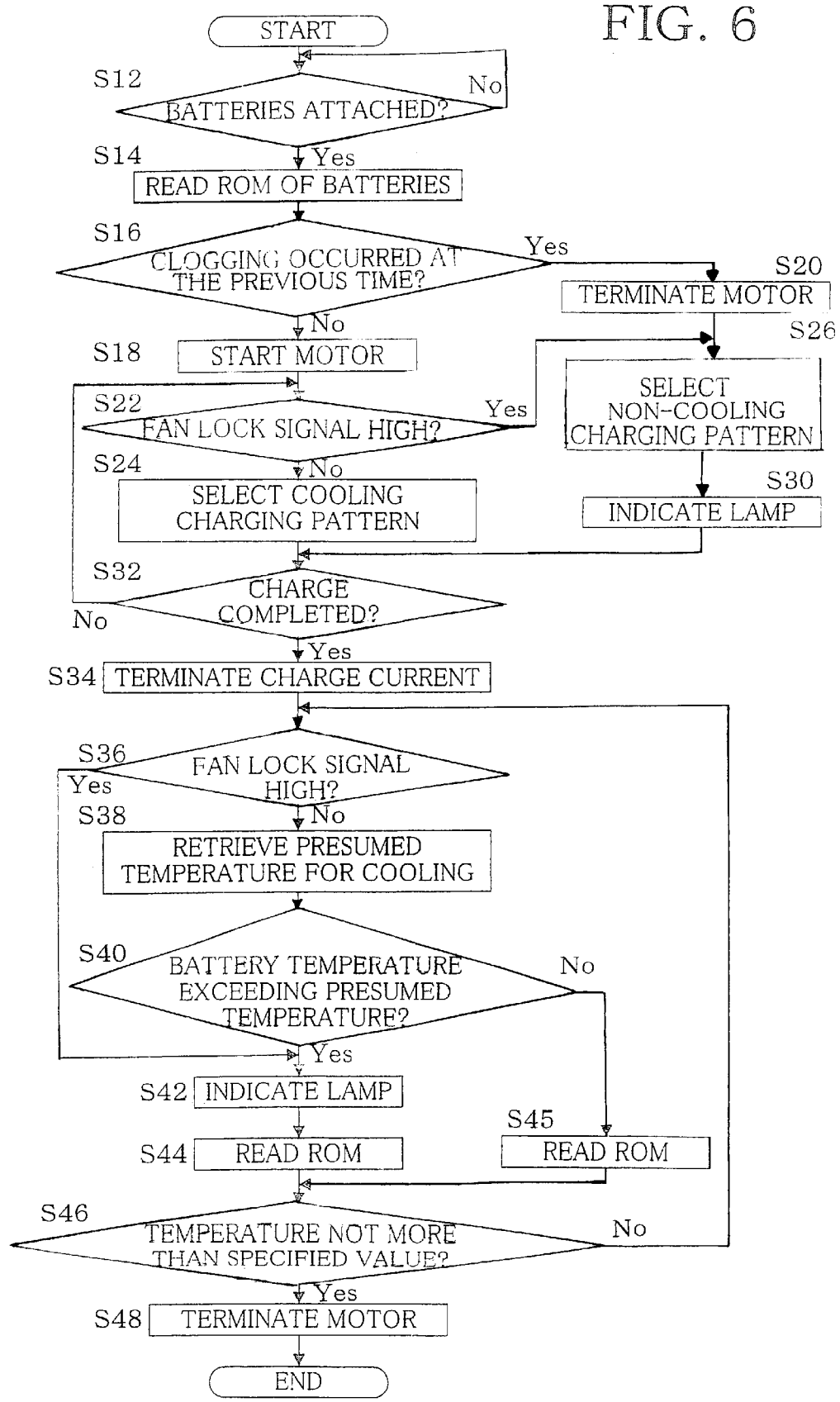
FIG. 6 is a flowchart showing processes performed in a control portion of the battery charging device according to the first embodiment.

Processes of charging and abnormality detecting operations performed by the control circuit 30 of the battery charging device 10 according to the first embodiment will now be explained with reference to the flowchart of FIG. 6.

Upon detecting that the battery package has been attached by means of a sensor (not shown)(S12: YES), the control portion 36 of the control circuit 30 reads contents of the EEPROM 58 of the battery package (S14). It is then judged whether cooling has been appropriately performed at the previous time of charge, that is, that no abnormality in cooling has been stored upon clogging of the airflow path 52 on the battery side such that cooling could not be performed (S16). When no clogging has occurred (S16: NO), the air-blowing motor 44 is started (S18). It is then judged whether a high signal has been input when rotation cannot be performed (fan lock condition)(S22). In case no high signal is input (S22: NO), a charging pattern with ordinary charge current in which cooling may be appropriately performed is selected for starting charge (S24). By judging whether charge has been completed (S32), and until charge is completed (S32: NO), the process returns to Step S22 for continuing charge while observing abnormal conditions of the air-blowing motor 44.

On the other hand, in case abnormality in cooling has been recorded in the above Step S16 upon clogging of the airflow path 52 on the battery side such that cooling could not be performed (S16: YES), the air-blowing motor 44 is terminated (S26). A charging pattern (non-cooling charging pattern), in which charge is performed for a long time at a charge current that is less than that of an ordinary charging pattern and in which cooling may not be appropriately performed, is selected for starting charge (S26). The LED lamp 39 is switched ON for indicating that the charging pattern is different from the ordinary one (S30). On the other hand, in case an abnormality signal (high signal) is input from the air-blowing motor 44 during charging (S22: YES), the LED lamp 39 is switched ON for indicating an abnormal condition (S30).

In the illustrated embodiment, clogging of the airflow path 52 of the battery package 50 is detected on a basis of the fact that the battery temperature at the time of completion of charge is higher than a presumed temperature after cooling of the batteries by not less than a specified value, and this condition is accordingly stored in the EEPROM 58 of the battery package, as it will be described later. In case an abnormal condition is stored in the EEPROM 58 at the time of starting charge, the charge current is decreased for performing charge. In this manner, optimal charge may be performed by decreasing the charge current even if clogging of the airflow path has occurred and cooling of batteries cannot be appropriately performed. Further, in case the clogging of the airflow path 52 of the battery package 50 has been eliminated by the operator, no abnormality is stored in the EEPROM 58 as it will be described later, and charge may be performed in a short time at the cooling charging pattern.

Figure 5:
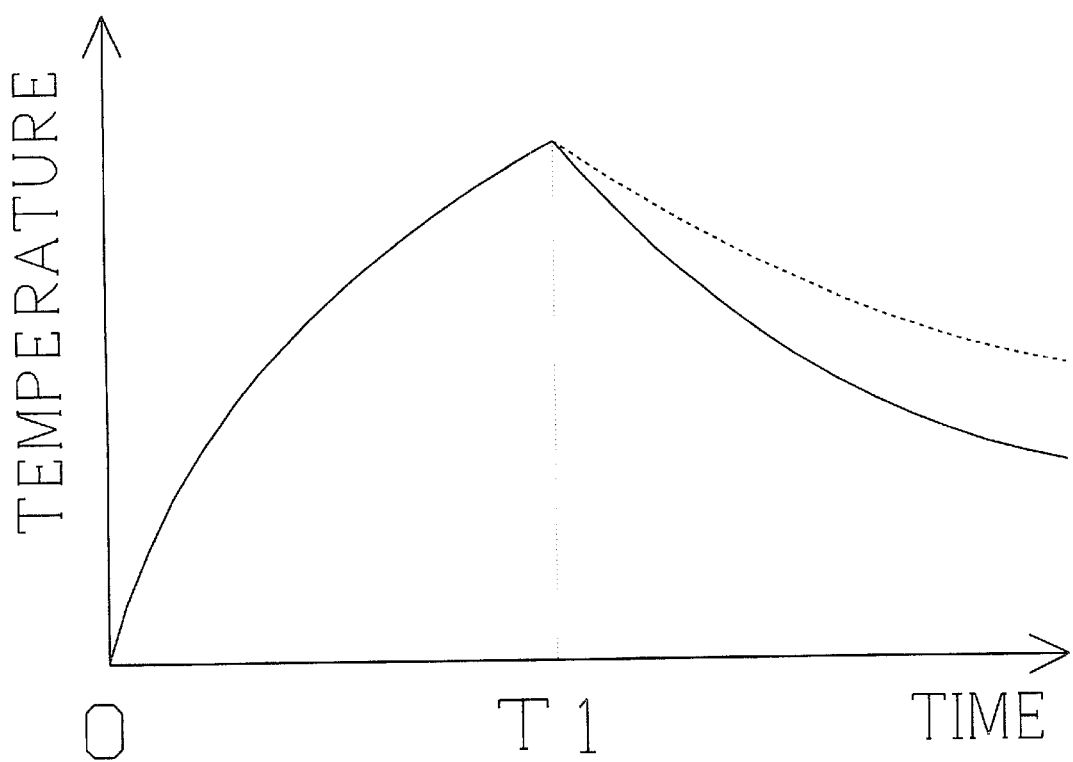
FIG. 5 is a graph showing temperature variations of the battery package.

Upon completion of charge (S32: YES), the charge current is terminated (S34). Thereafter, supply of air is continued by the air-blowing motor 44 while keeping on detecting abnormalities of the cooling means 40 for cooling the battery package 50 to a specified temperature. Here, it is first judged whether an abnormal signal (high signal) is input from the air-blowing motor 44 (S36), and in the case an abnormal condition has occurred (S36: YES), the LED lamp 39 is switched ON for indicating an abnormal condition (S42). On the other hand, unless no abnormality has occurred (S36: NO), a battery temperature (presumed temperature for cooling) is retrieved (S38). That is, the control circuit 30 stores in the memory portion 35 thereof temperatures of each elapsed time with respect to battery temperatures at the time of completion of charge (values of curve upon completion of charge as illustrated in FIG. 5) in a form of a map, and a presumed temperature for cooling corresponding to the elapsed time is retrieved from the map. The battery temperature is then measured, and it is judged whether the measured battery temperature is higher than the presumed temperature for cooling by not less than a specified value (e.g. 5° C.)(S40). In case the temperature is not higher (S40: NO), it is determined that the battery package is being appropriately cooled, and the process proceeds to Step S45 for writing a normal condition to the EEPROM 58 of the battery package (S45) and for judging whether the batteries have been cooled to a specified temperature (e.g. 40° C.) for terminating cooling (S46). In case they have not been cooled to this extent (S46: NO), the process returns to Step S36 for continuing cooling. On the other hand, in case they have been cooled to this extent (S46: YES), the air-blowing motor 44 is terminated (S48) for terminating the processes.

In judging whether the battery temperature that has been measured in the above Step S40 is higher than the presumed temperature for cooling by not less than a specified value, when the temperature is higher than the specified value (S40: YES), the LED lamp 39 is switched ON for indicating that clogging of the airflow path 52 of the battery package 50 has occurred (S42), and an abnormal condition is written to the EEPROM 58 of the battery package. When the LED lamp 39 has been switched ON, the operator may clean the airflow path 52 of the battery package 50 using resin wires or the like for eliminating the clogging, and the battery package 50 may be appropriately charged. On the other hand, in case the clogging cannot be eliminated, appropriate charge may still be performed by writing the abnormal condition to the EEPROM 58 and by performing the above-described non-cooling charging pattern.

Figure 7:
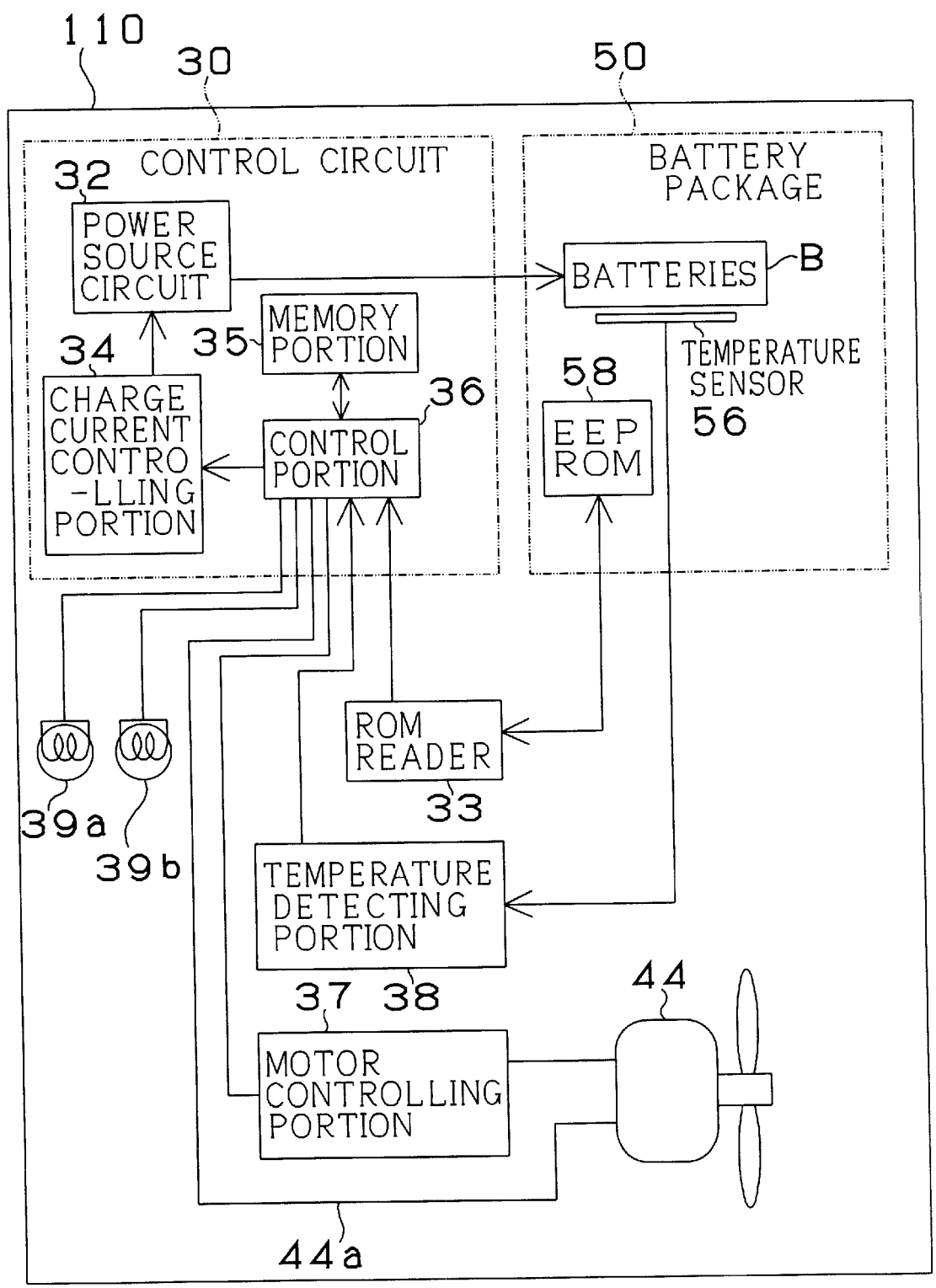
FIG. 7 is a block diagram showing a control circuit of the battery charging device according to a second embodiment.
Figure 8:
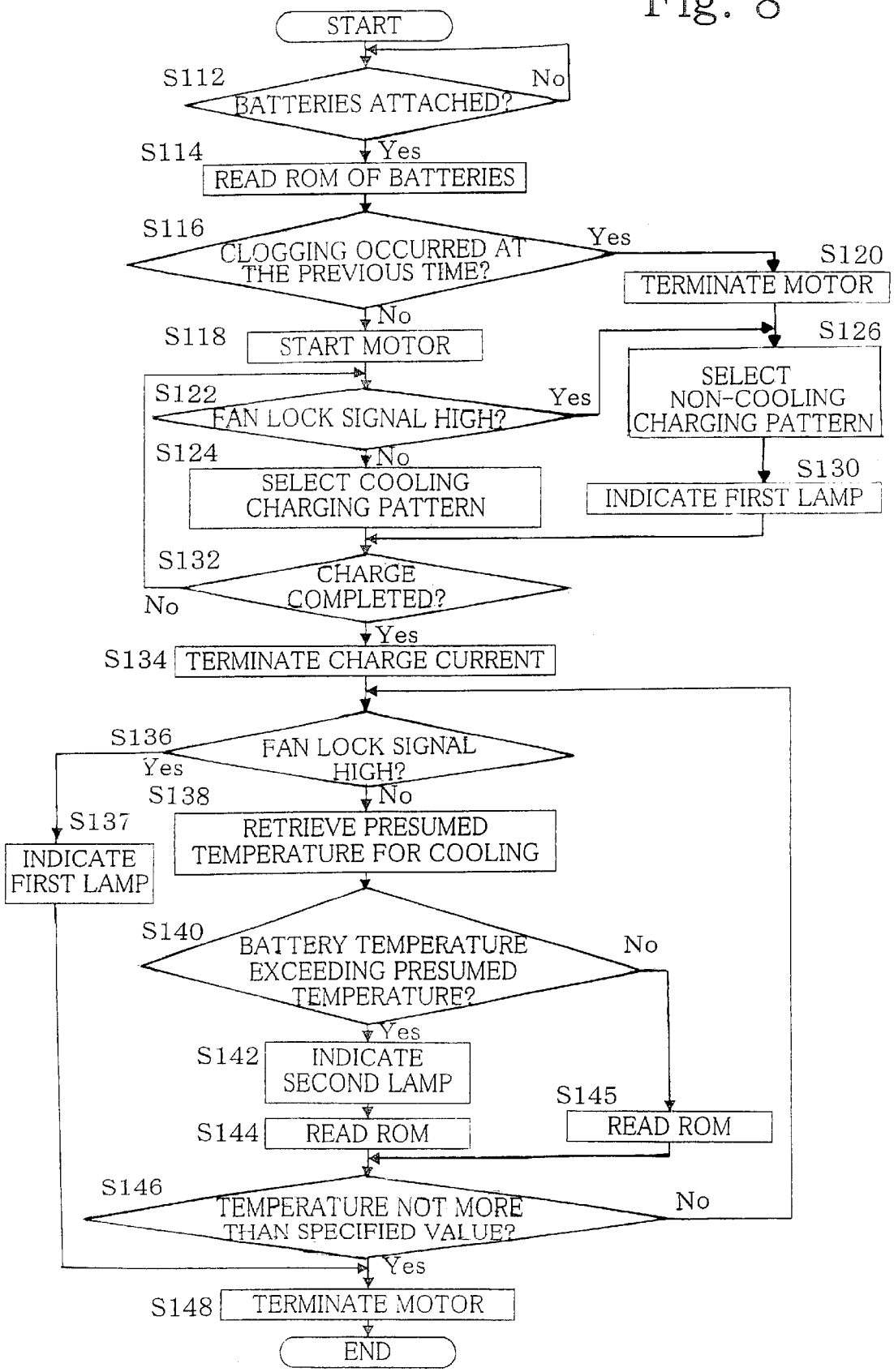
FIG. 8 is a flowchart showing processes performed in a control portion of the battery charging device according to the second embodiment.

A battery charging device 110 according to a second embodiment of the present invention will now be explained with reference to FIGS. 7 and 8. In the above-described battery charging device according to the first embodiment, the same LED lamp 39 was switched ON for indicating an abnormal condition of the air-blowing motor 44 as well as for indicating clogging of the airflow path. In contrast thereto, the battery charging device 110 of the second embodiment is comprised with a first LED lamp 39a for indicating an abnormal condition of the air-blowing motor 44 and with a second LED lamp 39b for indicating clogging of the airflow path, as illustrated in FIG. 7.

Processes of charging and abnormality detecting operations performed by the control circuit 30 of the battery charging device 110 according to the second embodiment will now be explained with reference to the flowchart of FIG. 8.

When the control portion 36 detects that the battery package has been attached by means of a sensor (not shown)(S112: YES), charge is performed through Steps S114 to S134 similarly to the first embodiment as explained above with reference to FIG. 6.

Upon completion of charge (S132: YES), the charge current is terminated (S134). Thereafter, supply of air is continued by the air-blowing motor 44 while keeping on detecting abnormalities of the cooling means 40 for cooling the battery package 50 to a specified temperature. Here, it is first judged whether an abnormal signal (high signal) is input from the air-blowing motor 44 (S136), and in case an abnormal condition has occurred (S136: YES), the first LED lamp 39a is switched ON for indicating an abnormal condition of the air-blowing motor 44 (S137). On the other hand, unless no abnormality has occurred (S136: NO), a battery temperature (presumed temperature for cooling) is retrieved (S138). The battery temperature is then measured, and it is judged whether the measured battery temperature is higher than the presumed temperature for cooling by not less than a specified value (S140). In case the temperature is not higher (S140: NO), it is determined that the battery package is being appropriately cooled, and the process proceeds to Step S145 for writing a normal condition to the EEPROM 58 of the battery package and for judging whether the batteries have been cooled to a specified temperature for terminating cooling (S146). In case they have not been cooled to this extent (S146: NO), the process returns to Step S136 for continuing cooling. On the other hand, in case they have been cooled to this extent (S146: YES), the air-blowing motor 44 is terminated (S148) for terminating the processes.

In judging whether the battery temperature that has been measured in the above Step S140 is higher than the presumed temperature for cooling by not less than a specified value, when the temperature is higher than the specified value (S140: YES), the second LED lamp 39b is switched ON for indicating that clogging of the airflow path 52 of the battery package 50 has occurred (S142), and an abnormal condition is written to the EEPROM 58 of the battery package (S144). It should be noted while two LED lamps have been employed in the second embodiment, it is alternatively possible to employ a single LED lamp that is arranged to be switched ON for indicating an abnormal condition of the air-blowing motor 44 and that flashes when clogging of the airflow path 52 has occurred.

The above-described battery charging device of the first embodiment may be arranged at low costs since one indicate lamp is concurrently used. On the other hand, the battery charging device of the second embodiment is capable of indicating abnormal portions in a separate manner.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A battery charging device provided with a cooling means for continuing cooling of batteries also upon completion of charge, comprising:

a judging portion for judging whether a battery temperature at the time of completion of charge is higher than a presumed temperature for cooling the batteries by not less than a specified value, and an abnormality indicating portion for indicating an abnormal condition in case it is judged by the judging portion that the temperature is higher by the specified value.

2. A battery charging device provided with an air-blowing motor for continuing supply of air to batteries provided with an airflow path also upon completion of charge, comprising:

a judging portion for judging whether a battery temperature at the time of completion of charge is higher than a presumed temperature for cooling the batteries by not less than a specified value, and an abnormality indicating portion for indicating an abnormal condition in case it is judged by the judging portion that the temperature is higher by the specified value and in case the air-blowing motor is continuing its operations.

3. The battery charging device as claimed in claim 2, wherein the abnormality indicating portion further indicates an abnormal condition when the air-blowing motor cannot be rotated.

4. A battery charging device provided with an air-blowing motor for continuing supply of air to batteries incorporating therein a memory means and being provided with an airflow path also upon completion of charge, comprising:

a charge current controlling portion for judging whether an abnormal condition is stored in the memory means incorporated in the batteries, and for performing charge at ordinary current in case no abnormal condition is stored, and for performing charge by decreasing the charge current in case an abnormal condition is stored, a judging portion for judging whether a battery temperature at the time of completion of charge is higher than a presumed temperature for cooling the batteries by not less than a specified value, and a memory portion for storing an abnormal condition to the memory means incorporated in the batteries in case it is judged by the judging portion that the temperature is higher by not less than the specified value.

* * * * *